Aug. 25, 1964    L. H. BEST ETAL    3,145,963
DISPLAY HOOK
Filed Aug. 6, 1962
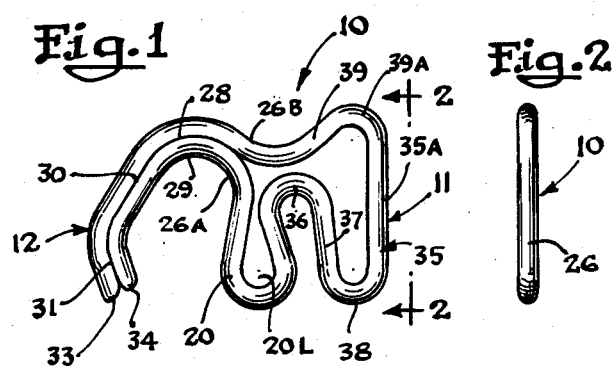
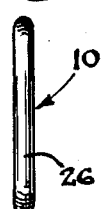
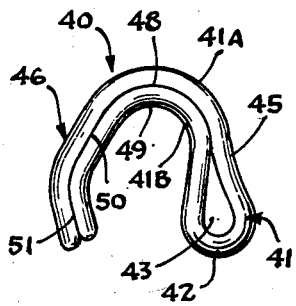
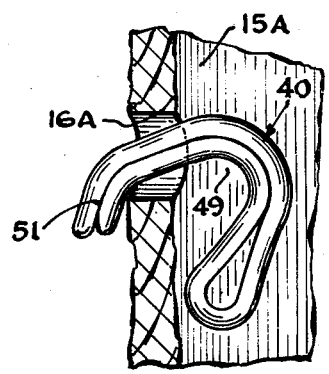
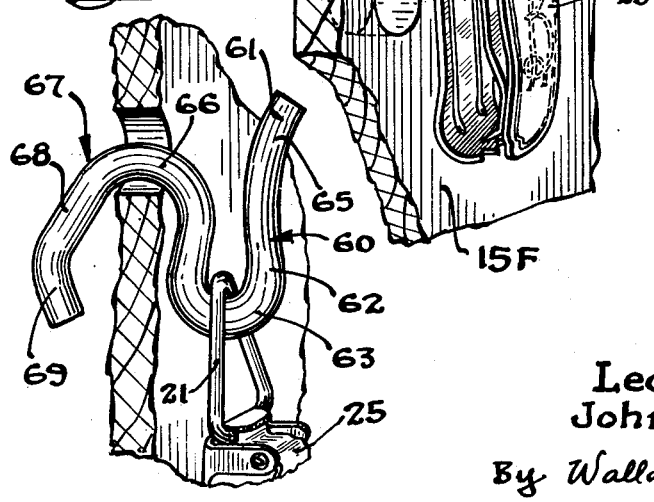
Inventors
Leon H. Best
John F. Buckner
By Wallace, Kinzer and Dorn
Attorneys 3,145,963
DISPLAY HOOK
Leon H. Best and John F. Buckner, Galva, Ill., assignors to John H. Best & Sons, Inc., Galva, Ill., a corporation of Illinois
Filed Aug. 6, 1962, Ser. No. 214,980
6 Claims. (Cl. 248—223)

This invention relates to a display hook adapted to be supported in an aperture of a perforated board.

There have been numerous proposals for hook devices or the like to be entered in a receiving opening designed therefore in a perforated board or like panel support, but in most instances the device has been complicated and hence expensive to manufacture, or has been of such nature as to be more or less rigidly associated with the board making it quite difficult to position and remove the device relative to the board.

Moreover, there are many instances where it is desirable to be able to readily remove the display hook structure from the aperture in which a portion thereof is entered, while nevertheless insuring against escape of the hook due to vibrations, jostling, or the like, and the primary object of the present invention is to enable such relationships to be achieved in a display hook that is relatively inexpensive to manufacture.

Another object of the present invention is to so construct the hook aforesaid as to afford, at the exterior portion thereof at the front of the board, a finger grip of generous portions that can readily be grasped.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is a side elevation of one form of display hook constructed in accordance with the present invention;

FIG. 2 is an end elevation on the line 2—2 of FIG. 1;

FIG. 3 is a perspective view showing the manner in which the display hook of FIG. 1 is to be associated with a perforated panel, the latter being illustrated partly in section;

FIG. 4 is a side elevational view illustrating another embodiment of the present invention;

FIG. 5 is a view similar to FIG. 3 but illustrating the manner in which the hook structure is stabilized against escape; and FIG. 6 illustrates another embodiment of the present invention.

The display hook 10, FIG. 1, is one that is fabricated from a single strip of material such as a wire or the like which can readily be deformed to the desired shape to include a head section generally indicated by the reference character 11 and a hook section generally indicated by the reference character 12.

The head section 11, as shown in FIG. 3, represents the portion of the display hook presented at the front of a display panel 15 or the like provided with apertures 16 through which the hook portion 12 will be inserted to be disposed at the rear of the board. All parts of the display hook lie substantially in a single plane as will be evident from FIG. 2, and the same is true of the modified form of hook structure hereinafter described in connection with FIGS. 4 and 5.

The head section 11, FIG. 1, includes a substantially U-shaped bight portion 20 which presents an upwardly curved bight affording an eye or loop 20L adapted to receive a ring, link or the like as 21, FIG. 3, suspending a clip, clasp, or the like 25 of conventional construction, and it will be recognized from what is shown in FIG. 3 that the bight portion 20, when the display hook is operatively associated with the panel 15, lies immediately adjacent and outward of the front display face 15F of the panel 15.

The strip or wire 26, FIG. 2, from which the display hook is fabricated is bent so that there are in effect two main legs 26A and 26B thereof, FIG. 1. It will be observed that these leg portions merge into contact with one another rearward of the bight 20, and, in an elevated position with respect thereto, afford a substantially C-shaped or crescent-shaped intermediate seat portion 28 of concave-convex form curving generally downwardly in a direction opposite that of the bight 20.

Thus, the curved intermediate part is so curved that the lower leg 26A defines a downwardly opening concavity defining a curved seat 29 at the lower side thereof adapted to seat in an aperture 16 in the panel 15. The combined width of the abutted legs 26A and 26B is substantially less than the diameter of the opening 16 to enable the same, and particularly the crooked part of the hook 12 to be easily passed through the aperture 16.

The seat portion of the hook structure represented by the crescent shaped part 28 merges into a downwardly and rearwardly directed straight portion 30 of an appreciable length. The end of the straight portion 30 opposite the seat 29 joins a second straight section 31 representing the crooked element of the hook structure which is bent downwardly and inwardly toward the suspending bight 20.

The legs 26A and 26B have their adjacent surfaces in contact throughout the hook section of the display hook 10 that lies between the seat 29 and the free ends 33 and 34 of the legs 26A and 26B. The free ends of the crook 31 terminate approximately at the level of the bight 20.

The head portion 11 is inclusive of a finger grip 35 of generous extent which is forward of the bight 20. The finger grip 35 is afforded by reversely bending the leg 26A at 36 in the extension thereof which is in an elevated position with respect to the bight 20. The bend 36 at the side opposite the bight 20 merges into a straight element 37 which in turn is bent upwardly at 38 at its lower end opposite the bight 20 to become a part of the finger grip 35.

In like manner, the portion 39 of the leg 26B forward of the crescent-shaped section 28 is of saddle shape and terminates in a downwardly bent hump 39A, FIG. 1, which merges neatly into the straight forwardmost part 35A of the finger grip 35, which is therefore substantially of closed loop form forward of the bight 20.

The finger grip 35 is therefore of generous size in comparison to the remainder of the structure, and enables the hook structure 10 to be conveniently grasped and manipulated when moving the hook section 12 into or out of the opening 16.

The crooked end 31 of the display hook 10 as noted above is bent inwardly or forwardly in the direction of the bight 20, and as a consequence is of such configuration as to prevent escape of the display hook under normal circumstances as will be explained hereinafter in more detail in connection with FIG. 5 of the drawing.

The particular type of clasp or snap 25 is no part of the present invention, and such is illustrated herein to demonstrate the manifest utility of the display hook structure 10 formed with an eye or a loop at the front part thereof adapted to receive a link, ring or the like as has been noted.

The modified hook structure 40, FIGS. 4 and 5, is one wherein the head portion 41 consists only of a bight 42 affording an eye 43 for the purpose of receiving a ring as 21, FIG. 3. Thus, the modified hook structure 40 does not include a projected finger grip forward of the suspending bight.

Again, the hook 40 is shaped from a single strip 45 of readily deformed metal substantially of wire form, inclusive of a rear hook section 46 that is identical to what has been described above in connection with the display hook 10. Thus, the two legs 41A and 41B of the strip 45 are bent substantially at the mid-portion thereof to define the bight 42, and the legs 41A and 41B are then directed upwardly and are abutted throughout the remaining length of the display hook.

The portion of the display hook 40 that is above the bight 42 is of crescent form 48, which is to say that the portion 48 of the display hook is provided with an intermediate bend or arcuate section bent in a direction opposite the bight 42 to afford a downwardly concave seat 49 which will seat at the bottom of an opening as 16A, FIG. 5, in the display board 15A.

Rearward of the bend 48, the hook section 46 is formed with a straight extension 50 that is directed away from the bight 42, and the straight extension 50 merges into a reversely bent straight section 51 that affords the crook at the rear free end of the display hook 40. As in the foregoing embodiment, the free end of the extension 51 is approximately at the level of the bight 42.

Referring to FIG. 5, the function and utility of the crook 51 is shown in detail, and it may be noted that what is now to be described prevails with respect to the crook 31 of the display hook 10.

Thus, the crook 51, or the crook 31, is so dimensioned as to drag on the back of the display board immediately adjacent the opening through which it has been inserted, when it is in the attitude shown in FIG. 5, thereby interfering with dislodgment of the hook 40, except that this be a purposeful withdrawing action on the part of the user.

In other words, the display hook of the present invenvention is of such shape as to be entered in the receiving aperture of the display board as the result of a purposeful prehensile thrusting or hooking action on the part of the user, and the same sort of an action in a reverse sense is required in order to purposely dislodge the display hook. It will therefore be seen that the crooked end 31 assures that the display hook will not be easily joggled loose in a withdrawing direction as will be evident from what is illustrated in FIG. 5.

FIG. 6 illustrates a hook 60 fabricated under the present invention from a single piece of round wire 61. The wire 61 includes a head section 62 characterized by an upwardly opening U-shaped bight 63 having the function described above, and the forwardmost leg of the bight 63 as viewed in FIG. 1 is extended upwardly to afford a finger grip end 65.

The rear leg of the bight 63 merges into a C-shaped downwardly opening bend or seat 66 adapted to be seated in a saddle relationship in an opening in a display board as above described, and again this seat is part of a rear hook section that includes a straight extension 68 that will project straight rearwardly from the back of the board. The extension 68 merges in to a terminal, inwardly directed straight extension 69 that is the crook part of the hook which serves as an impediment to inadvertent joggling loose of the hook.

It will be seen from the foregoing that the display hook of the present invention is one that can be easily fabricated from a single strip of material, to afford, at the head thereof, an upwardly opening U-shaped bight or loop representing the part of the hook on which a link or bail can be suspended. The link or bail in turn may have a clasp or the like associated therewith to be presented at the front of the display board with which the display hook of the present invention is used.

This display hook additionally includes a hook section including a uniquely bent crook adapted to drag on the back of the board to inhibit escape of the display hook under normal joggling or jostling conditions. The hook may be fabricated to be solely a single extension as in FIG. 6, but the hook can as easily include two leg members bent back on one another, as in FIGS. 1 and 4, and abutted to facilitate movement of the hook section into the receiving opening assigned thereto in the display panel.

Advantageously, the display hook is provided at the head section with a finger grip of generous proportions forward of the bight or loop mentioned above, and such enables the display hook to be easily manipulated and quickly grasped when it is desired to withdraw the display hook from the receiving opening in the display board.

Hence, while we have illustrated and described preferred embodiments of the present invention, it is to be understood that these are capable of variation and modification, and we therefore do not wish to be limited to the precise details set forth, but desire to avail ourselves of such changes and alterations as fall within the purview of the following claims.

We claim:

1. A display hook adapted to be supported in an aperture of a perforated board and comprising a strip of bent rigid material including a head section and a hook section, said head section including an upwardly opening substantially U-shaped bight to be located at the front of the board to enable an item at the front of the board to be suspended by the concavity thereof, said hook section including a downwardly opening substantially C-shaped bend defining a seat adapted to set in the opening in the board, said hook section including a straight portion extending downwardly as an extension of the C-shaped bend, and a crook at the end of said extension bent downwardly and inwardly toward the head section and adapted to abut the back of the board below the opening therein to inhibit escape of the display hook.

2. A display hook according to claim 1 wherein the head section includes a finger grip forwardly of the suspending bight.

3. A display hook according to claim 2 wherein the finger grip is substantially a closed, oval-shaped loop.

4. A display hook adapted to be supported in an aperture of a perforated board and comprising a strip of rigid material bent to have two legs together defining a head section and a hook section, said display hook being disposed in a single plane, said head section including an upwardly opening U-shaped bight characterized by a separation between the legs defining an eye to be located at the front of the board to enable an item to be suspended by the eye, said hook section including a downwardly opening C-shaped bend affording a seat curving opposite to said bight and adapted to set in the opening in the board, said hook section including a straight portion as an extension of the C-shaped bend, and a crook at the end of said extension bent inwardly toward the head section and adapted to abut the back of the board below the opening therein to inhibit escape of the display hook, said two legs being in substantial abutment from the C-shaped bend to the free end of the crook.

5. A display hook adapted to be supported in an aperture of a perforated board and comprising a strip of rigid material bent to provide a head section and a hook section, said display hook being disposed in a single plane, said head section including an upwardly opening U-shaped bight to be located at the front of the board to enable an item to be supported in the concavity thereof, said hook section including a downwardly opening C-shaped seat curving opposite to said bight and adapted to set in the opening in the board having the display hook thereon, said seat being located above said bight, said hook section including a straight portion as an extension of said seat, and a crook at the end of said extension bent inwardly toward the head section and adapted to abut the back of the board below the opening therein to prevent escape of the display hook, the free end of the crook being approximately at the level of said bight.

6. A hook according to claim 5 fabricated from a single extension of round wire.

References Cited in the file of this patent

UNITED STATES PATENTS

| | | |
|---|---|---|
| 1,767,745 | Day | June 24, 1930 |
| 3,012,745 | Donovan | Dec. 12, 1961 |
| 3,031,161 | Hawie | Apr. 24, 1962 |

FOREIGN PATENTS

| | | |
|---|---|---|
| 1,084,577 | France | July 7, 1954 |